United States Patent
Schootstra et al.

(10) Patent No.: US 9,618,212 B2
(45) Date of Patent: Apr. 11, 2017

(54) VEHICLE OVEN HAVING OPTIMIZED AIRFLOW

(71) Applicant: B/E AEROSPACE, INC., Wellington, FL (US)

(72) Inventors: Siebe Schootstra, Culemborg (NL); Nicolaas Johannes van Zwieten, Ravenswaaij (NL); Martijn Klok, Rijswijk (NL); Marcus Michael Cornelis Jaspers, Woerden (NL); Maarten Christiaan Groothoff, Culemborg (NL); Jelle Kuijten, Rijen (NL)

(73) Assignee: B/E Aerospace, Inc., Wellington, FL (US)

( * ) Notice: Subject to any disclaimer, the term of this patent is extended or adjusted under 35 U.S.C. 154(b) by 433 days.

(21) Appl. No.: 13/853,043

(22) Filed: Mar. 28, 2013

(65) Prior Publication Data

US 2013/0255657 A1 Oct. 3, 2013

Related U.S. Application Data (60) Provisional application No. 61/617,517, filed on Mar. 29, 2012.

(51) Int. Cl.
*F24C 15/32* (2006.01)
*A47J 37/01* (2006.01)
(Continued)

(52) U.S. Cl.
CPC .............. *F24C 15/322* (2013.01); *A21B 1/36* (2013.01); *A47J 37/01* (2013.01); *F24C 15/006* (2013.01); *F24C 15/327* (2013.01)

(58) Field of Classification Search
CPC .... F24C 15/322; F24C 15/327; F24C 15/006; A47J 37/01; A23L 1/0135; A21B 1/36
(Continued)

(56) References Cited

U.S. PATENT DOCUMENTS

| 2,582,887 A | 1/1952 | Sanford et al. |
| 3,315,654 A * | 4/1967 | Keating ................ F24C 15/322 126/21 A |

(Continued)

FOREIGN PATENT DOCUMENTS

| EP | 1739362 A2 | 1/2007 |
| FR | 1484923 A | 6/1967 |

(Continued)

OTHER PUBLICATIONS

International Search Report and Written Opinion issued in related application PCT/US2013/034510, Jul. 8, 2013, 11 pages.

(Continued)

*Primary Examiner* — Gregory Huson
*Assistant Examiner* — Daniel E Namay
(74) *Attorney, Agent, or Firm* — Drinker Biddle & Reath LLP (57) ABSTRACT

An oven includes a compartment enclosed on all sides and defining an interior therein, a heating element operable to heat air within the interior of compartment, and a fan disposed in fluid communication with the interior of the compartment. The fan is operable to cause air to flow across the heating element and toward the front region of the compartment. The oven includes a plurality of profile elements disposed on a panel at the front region of the compartment. The profile elements are structurally configured to direct air received at the panel from the fan back toward the fan through the interior of the oven in a more uniform spatial distribution than would result from a flat panel.

12 Claims, 8 Drawing Sheets

(51) Int. Cl.
*A21B 1/36* (2006.01)
*F24C 15/00* (2006.01)

(58) Field of Classification Search
USPC ... 126/21 A, 15 A, 273 R, 193; 99/330, 368, 99/474
IPC .................................. F24C 15/32; A47J 37/01
See application file for complete search history.

(56) References Cited

U.S. PATENT DOCUMENTS

| | | | | |
|---|---|---|---|---|
| 3,411,493 A * | 11/1968 | Everson | ............. | F24C 3/027 |
| | | | | 126/21 A |
| 3,463,138 A * | 8/1969 | Lotter | ................ | A21B 1/02 |
| | | | | 126/21 A |
| 3,707,145 A * | 12/1972 | Anetsberger | ......... | F24C 15/322 |
| | | | | 126/197 |
| 3,710,775 A | 1/1973 | Tamada et al. | | |
| 3,855,451 A * | 12/1974 | Lee | ................ | A47J 39/003 |
| | | | | 126/21 A |
| 3,861,378 A * | 1/1975 | Rhoads | ............. | A21B 1/50 |
| | | | | 126/21 A |
| 3,926,106 A * | 12/1975 | Deusing | ............. | F24C 15/322 |
| | | | | 126/21 A |
| 3,958,552 A * | 5/1976 | Lawler | ............. | B01J 6/00 |
| | | | | 126/21 A |
| 3,973,551 A * | 8/1976 | Caselani | ............. | F24C 15/322 |
| | | | | 126/21 A |
| 3,978,843 A * | 9/1976 | Durth | ............. | 126/21 A |
| 3,991,737 A * | 11/1976 | Del Fabbro | ......... | F24C 15/322 |
| | | | | 126/21 A |
| 4,516,012 A * | 5/1985 | Smith | ............. | F24C 15/322 |
| | | | | 126/21 A |
| 4,700,685 A | 10/1987 | Miller | | |
| 5,000,769 A * | 3/1991 | Raguideau et al. | ............. | 55/406 |
| 5,069,273 A | 12/1991 | O'Hearne | | |
| 5,309,981 A * | 5/1994 | Binder | ............. | F24C 15/025 |
| | | | | 126/21 A |
| 5,394,791 A * | 3/1995 | Vallee | ............. | A21B 1/44 |
| | | | | 126/21 A |
| 5,460,157 A * | 10/1995 | Prabhu | ............. | F24C 15/322 |
| | | | | 126/21 A |
| 5,696,872 A * | 12/1997 | Seward | ............. | 392/341 |
| 6,069,344 A * | 5/2000 | Krasznai et al. | ............. | 219/400 |
| 7,766,003 B2 * | 8/2010 | Kim et al. | ............. | 126/21 A |
| 7,867,534 B2 | 1/2011 | Sells et al. | | |
| 2003/0172919 A1 * | 9/2003 | Rabas et al. | ............. | 126/21 A |
| 2005/0061795 A1 * | 3/2005 | Paller | ............. | 219/400 |
| 2005/0103322 A1 * | 5/2005 | Smith et al. | ............. | 126/39 C |
| 2005/0224064 A1 | 10/2005 | Stockley | | |
| 2006/0237182 A1 | 10/2006 | Godecker et al. | | |
| 2008/0087657 A1 * | 4/2008 | Lee et al. | ............. | 219/400 |
| 2008/0105249 A1 * | 5/2008 | McFadden et al. | ............. | 126/21 A |
| 2009/0013987 A1 * | 1/2009 | Akdag et al. | ............. | 126/21 A |
| 2009/0045184 A1 * | 2/2009 | Nam | ............. | 219/400 |
| 2009/0090347 A1 * | 4/2009 | Kim et al. | ............. | 126/21 A |
| 2009/0134140 A1 * | 5/2009 | Van Der Weij | ............. | 219/400 |
| 2010/0230396 A1 | 9/2010 | Boubeddi et al. | | |
| 2011/0031322 A1 * | 2/2011 | Zou et al. | ............. | 236/1 B |
| 2011/0278278 A1 * | 11/2011 | Emerich | ............. | A47J 39/006 |
| | | | | 219/400 |
| 2012/0125313 A1 * | 5/2012 | Van Der Weij | ............. | 126/21 R |
| 2014/0174426 A1 * | 6/2014 | Moon et al. | ............. | 126/21 A |

FOREIGN PATENT DOCUMENTS

| | | | |
|---|---|---|---|
| JP | 61153320 A | * | 7/1986 |
| JP | 61-282721 A | | 12/1986 |
| JP | 5-141669 A | | 6/1993 |
| JP | 11-166737 A | | 6/1999 |

OTHER PUBLICATIONS

Office Action issued in related application CA 2,867,157, Sep. 29, 2015, 3 pages.
Office Action issued in related application JP 2015-503625, Oct. 27, 2015, with translation, 8 pages.
Office Action issued in related application CN 201380022578.0, Nov. 4, 2015, 13 pages.
Supplementary European Search Report issued in related application EP 13768833.9, Nov. 17, 2015, 6 pages.
Final Office Action issued in related application JP 2015-503625, Mar. 4, 2016, with translation, 7 pages.
Decision of Rejection issued in related application JP 2015-503625, Oct. 14, 2016, with translation, 5 pages.

* cited by examiner

VEHICLE OVEN HAVING OPTIMIZED AIRFLOW

CROSS-REFERENCE TO RELATED APPLICATION

This application claims the priority benefit of U.S. Provisional Patent Application No. 61/617,517 entitled "Vehicle Oven Having Optimized Airflow" and filed on Mar. 29, 2012, which is hereby incorporated herein by reference in its entirety.

BACKGROUND

Field

Embodiments relate to an oven for heating food. More specifically, embodiments relate to a vehicle oven having optimized airflow.

Related Art

Conventional ovens for use in vehicles, such as aircraft, typically have unequal airflows within the oven. Different amounts of air flow through different regions of the oven at different velocities, resulting in unequal heating of food being heated or cooked within the oven.

SUMMARY

According to an embodiment, an oven includes a compartment enclosed on all sides and defining an interior therein, a heating element operable to heat air within the interior of the compartment, and a fan disposed in fluid communication with the interior of the compartment. The fan is operable to cause air to flow across the heating element and toward a front region of the compartment. The oven also includes a panel disposed at the front region of the compartment, and a plurality of profile elements disposed on the panel and structurally configured to direct air received at the panel from the fan back toward the fan through the interior of the oven in a more uniform spatial distribution than would result from a flat panel.

The oven may further include a door at the front region of the compartment. The door may further include the panel on an interior side thereof and be operable to open the compartment.

Each of the plurality of profile elements may be selected from the group consisting of fins, blades, and hole patterns.

Each of the plurality of profile elements may have a surface disposed at an angle relative to a plane of a surface of the panel.

The oven may further include a divider disposed parallel with a direction of airflow on either side of the divider, the divider dividing regions of the compartment through which air flows in opposite directions from one another, the divider providing an opening at the front region of the compartment to facilitate air flowing from the fan to the front region of the compartment through a first region adjacent the divider, through the opening in the divider at the front region of the compartment from the first region to a second region on an opposite side of the divider, and from the front region of the compartment toward the fan through the second region adjacent the divider.

According to another embodiment, an oven includes a compartment enclosed on all sides, a heating element operable to heat air within the compartment, and a fan disposed at a back region of the compartment. The fan causes air to flow across the heating element and toward a front region of the compartment. The oven also includes a generally vertical panel disposed at the front region of the compartment, and a plurality of profile elements disposed on the generally vertical panel and structurally configured to direct air received at the generally vertical panel from the fan back toward the fan through an interior of the oven in a more uniform spatial distribution than would result from a flat generally vertical panel.

The oven may further include a door at the front region of the compartment. The door may include the generally vertical panel on an interior side thereof and be operable to open the compartment.

Each of the plurality of profile elements may be selected from the group consisting of fins, blades, and hole patterns.

Each of the plurality of profile elements may have a surface disposed at an angle relative to a plane of a surface of the generally vertical panel.

The oven may also include a divider dividing the compartment into a first region and a second region. The divider may provide an opening at the front region of the compartment to facilitate air flowing from the back region of the compartment to the front region of the compartment through the first region, through the opening in the divider from the first region to the second region, and from the front region of the compartment to the back region of the compartment through the second region.

The compartment may be sized to accommodate a plurality of meal carriers. A width of the first region may be large enough to accommodate at least one of the plurality of meal carriers, and a width of the second region may be large enough to accommodate at least one of the plurality of meal carriers.

The plurality of profile elements may be structurally configured to direct air received at the generally vertical panel from the first region through the opening provided by the divider and toward the back region of the compartment through the second region.

The heating element may include an electrical heating element that heats when electrical current is passed therethrough.

The heating element may encircle a majority of the fan and the fan may blow air outwardly across a majority of the heating element that encircles the fan.

According to another embodiment, a method of heating an oven includes heating a heating element of the oven, causing air to flow across the heated heating element by a fan, heating the air that flows across the heated heating element by the heating element, and directing the heated air from a back region toward a front region of the oven. The method also includes redirecting the heated air from the front region toward the back region by a plurality of profile elements disposed on a generally vertical panel at the front region of the oven in a more uniform spatial distribution than would result from a flat generally vertical panel.

Directing the heated air toward a front region may include directing the heated air through a first airflow region. The method may further include redirecting the heated air at the front region from the first airflow region toward a second airflow region by at least one of the plurality of profile elements disposed on the generally vertical panel at the front region of the oven. Redirecting the heated air from the front region toward the back region of the oven may include directing the heated air through the second airflow region.

The first airflow region and the second airflow region may be separated by a divider disposed parallel to airflow within the first airflow region and the second airflow region, the divider providing an opening at the front region to facilitate redirecting the heated air at the front region from the first airflow region toward the second airflow region.

Directing the heated air toward the front region may further include directing the heated air through a meal carrier in the first airflow region, and redirecting the heated air from the front region toward the back region may further include directing the heated air through a meal carrier in the second airflow region.

Heating the heating element may include passing electrical current through an electrical heating element.

According to another embodiment, an oven includes a compartment enclosed on all sides, a door on a front side of the compartment, the door operable to open the compartment, a heating element operable to heat air within the compartment, a fan disposed at a back side of the compartment, the fan operable to cause airflow to pass across the heating element and toward the front side of the compartment, and a plurality of fins, blades, or hole patterns disposed at an inner surface of the door and operable to direct airflow received at the door from the fan back toward the fan through an interior of the compartment.

According to another embodiment, an oven includes a compartment enclosed on all sides and sized to have greater width than depth to accommodate a plurality of meal carriers side-by-side, a door on a front side of the compartment, the door operable to open the compartment, a heating element operable to heat air within the compartment, and a fan disposed at a back side of the compartment, the fan operable to cause airflow to pass across the heating element and toward the front side of the compartment. The oven may further include a plurality of fins, blades, or hole patterns disposed at an inner surface of the door and operable to direct airflow received at the door from the fan back toward the fan through an interior of the compartment.

According to another embodiment, an oven includes a compartment enclosed on all sides and sized to have greater width than depth to accommodate a plurality of meal carriers side-by-side, a door on a front side of the compartment, the door operable to open the compartment, a heating element operable to heat air within the compartment, a fan disposed at a back side of the compartment, the fan operable to cause airflow to pass across the heating element and toward the front side of the compartment, and a vertical divider dividing the compartment into a first region and a second region (e.g., a left region and a right region, or vice versa), the vertical divider having a gap or opening at the front side of the compartment such that air flows from the back side of the compartment to the front side of the compartment through the first region, through the gap or opening in the vertical divider from the first region to the second region, and from the front side of the compartment to the back side of the compartment through the second region.

While the exemplary embodiments described herein are presented in the context of an oven for an aircraft galley, these embodiments are exemplary only and are not to be considered limiting. The embodiments of the apparatus are not limited to ovens for use in an aircraft galley. For example, embodiments of the apparatus may be adapted for a refrigerator, freezer, and other food storage and cooking devices. Various embodiments may thus be used in any vehicle, including aircraft, spacecraft, ships, buses, trains, recreational vehicles, trucks, automobiles, and the like. Embodiments of the apparatus may also be used in homes, offices, hotels, factories, warehouses, garages, and other buildings where it may be desirable to have more uniform temperatures inside a heating or cooling compartment. In general, the embodiments may be used in any location or application in which more uniform temperatures inside a heating or cooling compartment is desired.

BRIEF DESCRIPTION OF THE DRAWINGS

Exemplary embodiments will be explained in more detail with reference to the attached drawings in which the embodiments are illustrated as briefly described below.

DETAILED DESCRIPTION

A conventional oven typically includes a heating element surrounding a fan disposed at a back wall of the oven. The heating element is typically operatively coupled with components and systems exterior to the oven via connectors. The oven also typically includes a water connector for generation of water vapor within the oven.

In the conventional oven, air flows along the sides of an interior of the conventional oven in a general direction from the fan disposed at the back wall to the front door, and then returns to the fan through a central region of an interior of the oven. The fan disposed at the back wall typically blows air within the oven along the back wall outwards from the fan across the heating element and toward the sides of the oven. The air then flows along the sides of the oven toward the front door. When the flowing air reaches the front door, the flowing air from the left, right, top, and bottom sides of the oven typically collide and are drawn backward through the central region of the oven by the fan. As the flowing air passes through the central region of the oven, the flowing air passes through meal carriers and between meal trays disposed in the oven for heating and cooking food.

Typically, airflow velocities are greatest along the sides of the conventional oven toward the back wall, and drop off toward the front door of the oven. Airflow velocities returning to the fan through the central region of the interior of the oven are typically lower than airflow velocities going toward the front door in the general direction along the edges of the oven.

Airflow velocities in the center region of the conventional oven returning to the back wall are typically higher than airflow velocities in the outer (e.g., upper and lower) regions of the conventional oven returning to the back wall. Thus, the airflows in the center region of the oven typically carry a greater amount of energy and transfer a greater amount of heat to food being heated or cooked in the oven than the airflows in the upper and lower regions of the oven. As a result, meals placed on meal trays in the oven will not heat or cook evenly, as those in the upper and lower regions will not receive as much heat as those in the center region of the conventional oven.

Figure 1:
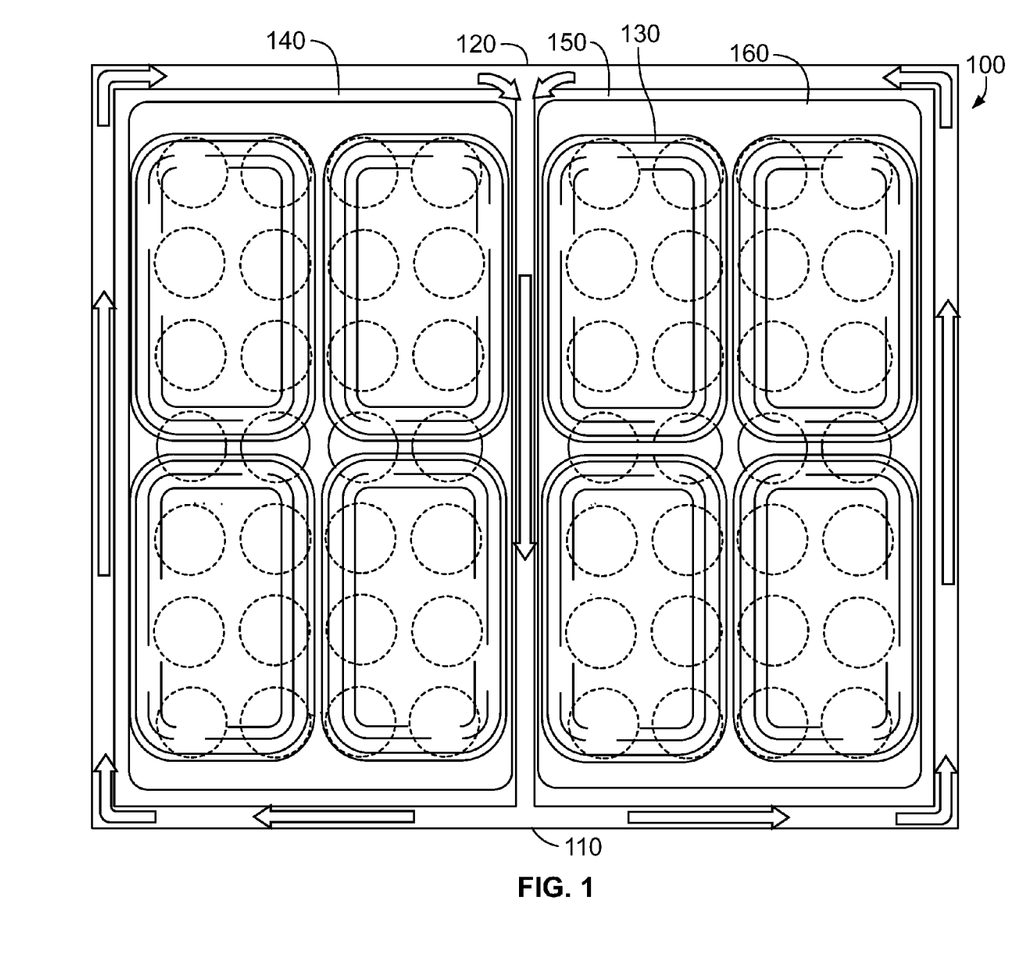
FIG. 1 illustrates a top plan view of a double oven showing airflow through the double oven, according to an embodiment.

FIG. 1 illustrates a top plan view of a double oven 100 showing airflow through the double oven 100, according to an embodiment. The airflow is represented by block arrows in FIG. 1. The double oven 100 includes a compartment enclosed on all sides, a back wall 110 having a fan, a heating element at the back wall operable to heat air within the compartment by heating air blown across the heating element by the fan, a front door 120 having a generally flat interior surface, and two meal carriers 140 and 150 each holding a plurality of meal trays 160. Each of the meal trays 160 holds a plurality of meals 130. One meal carrier 140 on the left side of the oven 100 holds four meals 130 per level, and one meal carrier 150 on the right side of the oven 100 also holds four meals 130 per level. Use of the double oven provides efficiencies by saving space and weight compared to use of two conventional single ovens to achieve a same capacity to heat meals. The double oven 100 would save space and have a lower weight and total cost of ownership than an equivalent number of conventional single ovens needed to heat or cook a same number of meals because oven components and enclosures would not be unnecessarily duplicated.

As illustrated in FIG. 1, airflow velocities are high moving from the back wall 110 along the left and right sides of the double oven 100 toward the front door 120, and then returning from the front door 120 through the center of the oven 100 between the meal carriers 140 and 150 to the fan at the back wall 110. Airflows passing through the regions of the oven 100 in which the meal trays 160 are positioned are low in comparison. As a result, there is greater heat at the sides and in the center of the oven 100 than there is in the regions where the meal trays 160 are positioned. The high velocity airflow in the center of the oven 100 is ineffective at transferring heat to the meals 130 in the meal trays 160 because the airflow passes between the meal carriers 140 and 150 that hold the meal trays 160.

Figure 2:
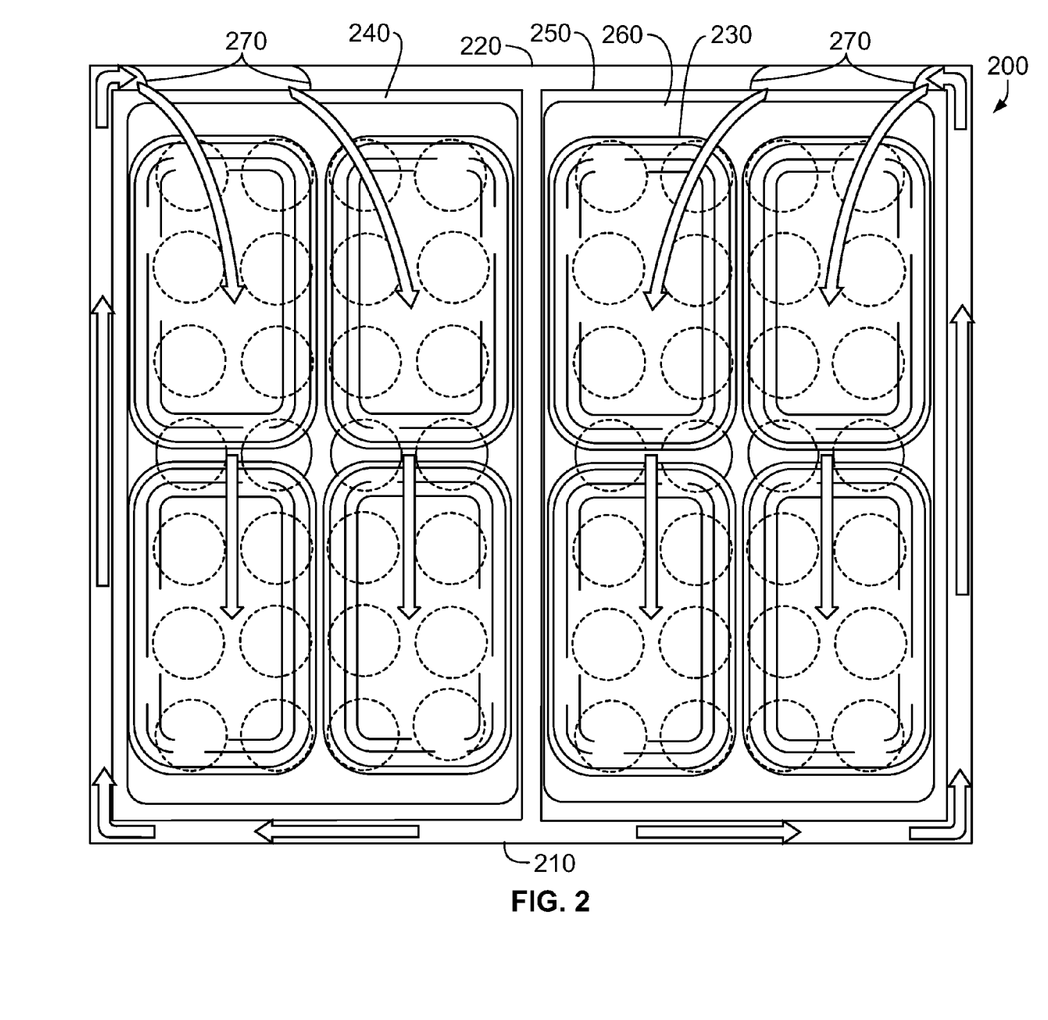
FIG. 2 illustrates a top plan view of a double oven showing airflow through the double oven, according to another embodiment.

FIG. 2 illustrates a top plan view of a double oven 200 showing airflow through the double oven 200, according to an embodiment. The airflow is represented by block arrows within FIG. 2. The double oven 200 illustrated in FIG. 2 is similar to the double oven 100 of FIG. 1, except that the front door 220 of the double oven 200 includes a profiled inner surface having profile elements 270, for example, fins, blades, or hole patterns, disposed on a generally vertical panel, for example, the inside surface of the front door 220. The profile elements 270 may be disposed in one or more arrays, although this should not be construed as limiting, as the profile elements 270 may be disposed in a variety of other configurations. The profile elements 270 guide the airflow coming from the back wall 210 of the oven 200 to redirect the airflow returning to the back wall 210 to more evenly distribute the returning airflow within the oven 200 than would result from a flat generally vertical panel. The returning airflow may be directed through the meal carriers 240 and 250 in oven 200 rather than between the meal carriers 140 and 150 as in oven 100. As such, areas which have lower airflow in the oven 100 have a higher airflow in the oven 200. The location, shape, and amount of fins, blades, or hole patterns may be adjusted to modify the return airflow through oven 200 in order to result in a more uniform heat distribution throughout the oven 200. By more evenly distributing the airflow within the oven 200, the temperature in the oven 200 will be more uniform than in the oven 100. This benefit is especially important in double ovens or other ovens that hold more than one meal carrier side by side, because the high velocity airflow through the center of the oven 100 is ineffective at transferring heat to the meals 130 in the meal trays 160 within the meal carriers 140 and 150. In contrast, the more uniform airflow and temperature of the oven 200 is more effective at heating meals 230 disposed on meal trays 260 in the meal carriers 240 and 250 within the oven 200.

Figure 3:
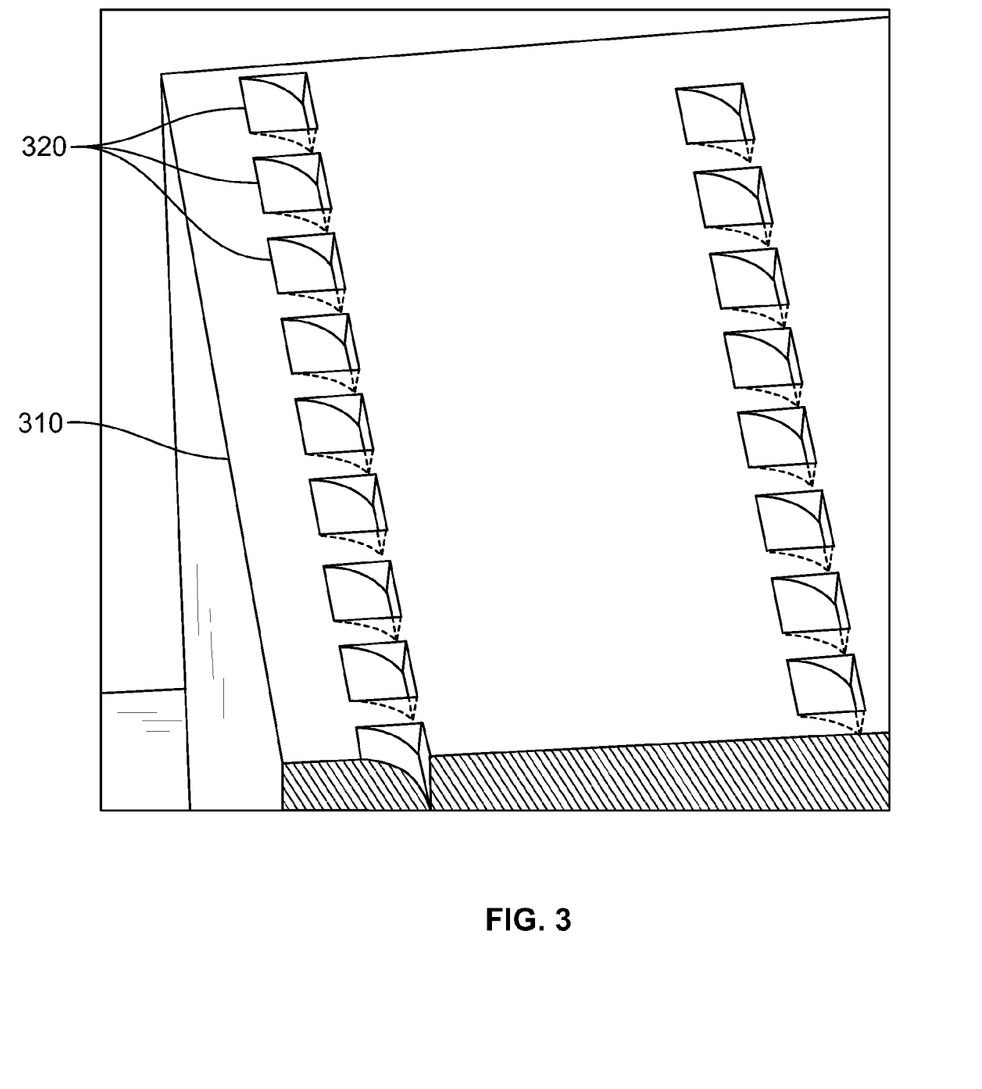
FIG. 3 illustrates a detailed perspective view of oven door profile elements at an interior of an oven door, according to an embodiment.

FIG. 3 illustrates a detailed perspective view of oven door profile elements 320 at an interior of an oven door 310, according to an embodiment. The oven door profile elements 320 are examples of the oven door profile elements 270 (e.g., fins, blades, or hole patterns) that may be installed at the oven door 220 of FIG. 2. The profile elements 320 have a surface disposed at an angle relative to a plane of a surface of the oven door 310. The illustrated oven door profile elements 320 should not be construed as limiting, as the shapes, positions, and quantity of oven door profile elements may be adjusted and varied in order to produce different desired interior airflows of ovens such as the oven 200 in various embodiments. For example, computational fluid dynamic (CFD) simulations may be performed of oven interiors using different shapes, positions, and quantity of oven door profile elements in order to determine optimal designs for desired interior airflows and uniform interior temperatures of ovens using the profile elements.

Figure 4:
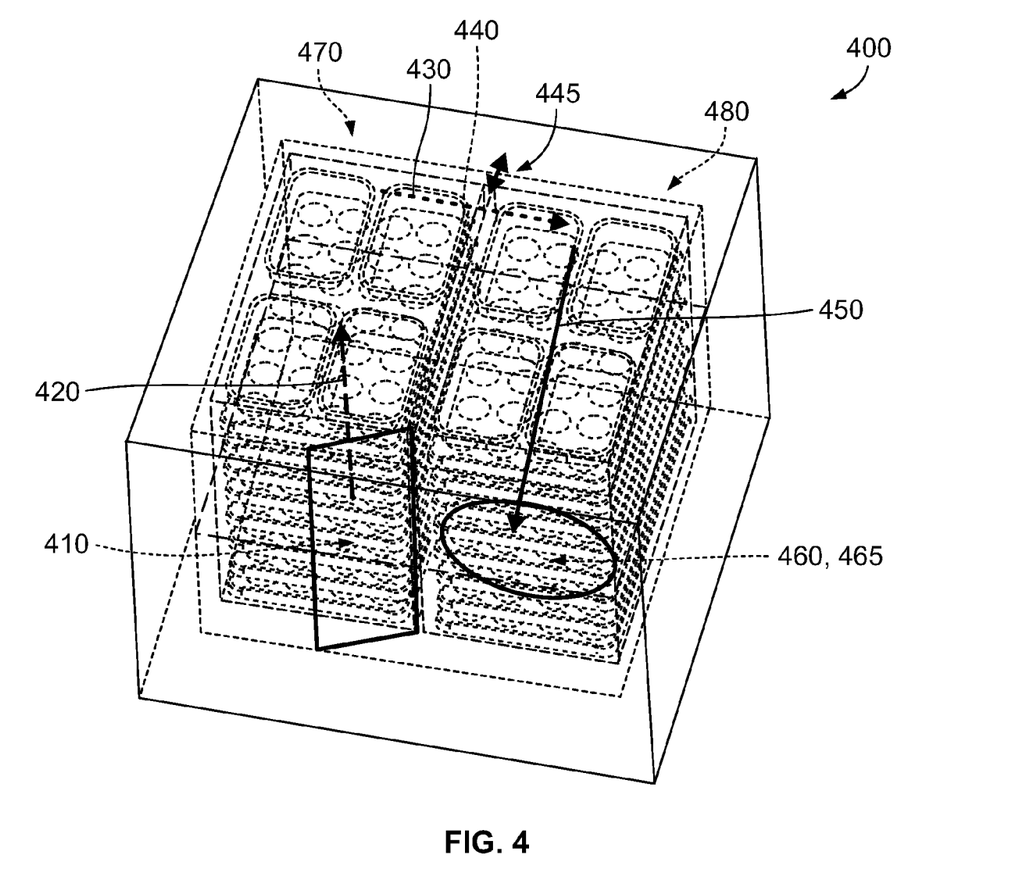
FIG. 4 illustrates a perspective view of a double oven having a vertical divider between a left meal carrier seating region and a right meal carrier seating region, according to an embodiment.

FIG. 4 illustrates a perspective view of a double oven 400 having a vertical divider between a left meal carrier seating region 470 and a right meal carrier seating region 480, according to an embodiment. The oven 400 may include a fan 460 and heating element 465 at a back wall. The heating element 465 may be an electrical heating element, or another type of heating element as known in the art. In the case of an electrical heating element, the heating element may be heated by passing electrical current through an electrical device, for example, an electrically resistive heating element or a thermoelectric device. Other heating elements that are heated by or heat air using other power sources or fuels may be used in various embodiments as known in the art, for example, gas, propane, or kerosene. The heating element 465 may encircle a majority of the fan 460 and the fan 460 may blow air outwardly across a majority of the heating element 465 that encircles the fan 460. In other embodiments, the heating element 465 may be positioned relative to the fan 460 and optional ducting to provide a majority of the air blown by the fan 460 to the vicinity of the heating element 465 to heat the majority of the air blown by the fan 460. For example, the fan 460 may be positioned elsewhere from the back wall and the ducting may deliver the airflow from the fan 460 to the heating element 465 and a hot air inlet 410.

An objective of the design of the oven 400 is to avoid high velocity airflow along the walls of the oven 400, where the airflow loses heat to the oven walls instead of to meals being heated or cooked in the oven 400. The oven 400 accomplishes this objective by directing the airflow through the left meal carrier region 470 along a path 420 from back to front, directing the airflow at the front of the oven 400 from the left meal carrier region 470 to the right meal carrier region 480 along a path 430, and then directing the airflow through the right meal carrier region 480 along a path 450 from front to back. The airflow is directed from the fan 460 at the back wall, past the heating element 465 which heats the airflow, and through the hot air inlet 410 such that the airflow passes through the left meal carrier region 470 along the path 420 from back to front. The airflow is finally directed through the right meal carrier region 480 along the path 450 into a fan outlet or inlet to the fan 460 where the airflow cycle repeats. The illustrated directions of airflows should not be construed as limiting, as in various embodiments, the airflow paths may be reversed.

A divider plate 440 is positioned from front to back in the center of the oven 400 between the left and right meal carrier regions 470 and 480 in order to prevent the airflow from taking shortcuts from left to right, or vice versa, rather than continue along paths 420, 430, and 450. The divider plate 440 has an opening or gap 445 at the front of the oven 400 to allow airflow along path 430 to pass through opening or gap 445 from one side to the other side of the oven 400. In various embodiments, the opening or gap 445 may be adjusted in size, shape, and location to achieve the desired airflow. For example, the opening or gap 445 may be a vertical gap from top to bottom of the oven interior along the front door of the oven 400, and may be approximately 18 mm wide.

Figure 5:
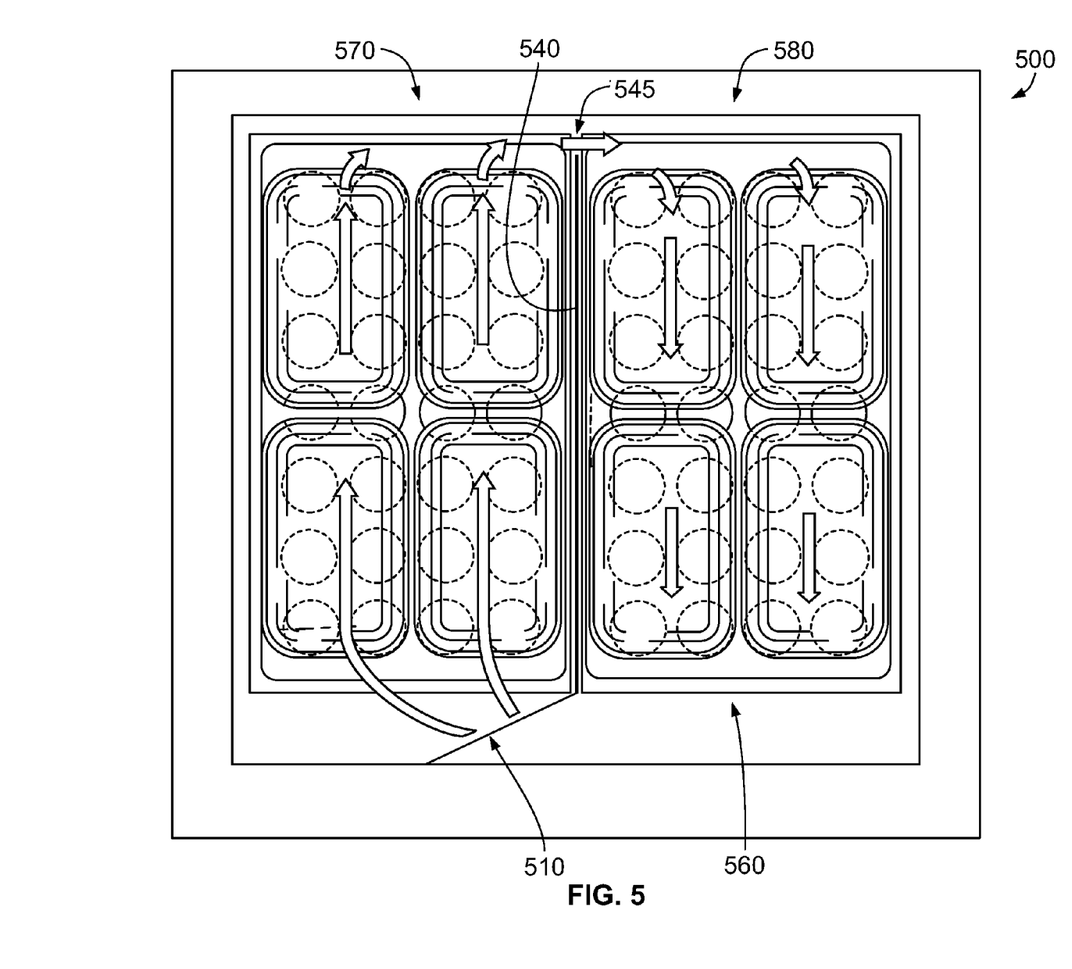
FIG. 5 illustrates a top plan view of a double oven having a vertical divider between a left meal carrier seating region and a right meal carrier seating region, showing airflow through the double oven, according to an embodiment.

FIG. 5 illustrates a top plan view of a double oven 500 having a vertical divider 540 between a left meal carrier seating region 570 and a right meal carrier seating region 580, showing airflow through the double oven 500, according to an embodiment. The double oven 500 may be an embodiment of the double oven 400 of FIG. 4. The airflow is represented by block arrows within FIG. 5 starting from a hot air inlet 510 and returning to the fan 560. In detail, heated air flows from the hot air inlet 510, through the meal carrier seating region 570, through an opening or gap 545 at the front of the vertical divider 540 from the meal carrier seating region 570 to the meal carrier seating region 580, and then through the meal carrier seating region 580 to return to the fan 560. As illustrated, the airflow through the oven 500 is distributed through the meal carrier seating regions 570 and 580, and is not concentrated along the walls of the oven 500. As such, the oven 500 transfers heat to the meals on meal trays in the meal carriers within the meal carrier seating regions 570 and 580 more effectively than the oven 100.

Figure 6:
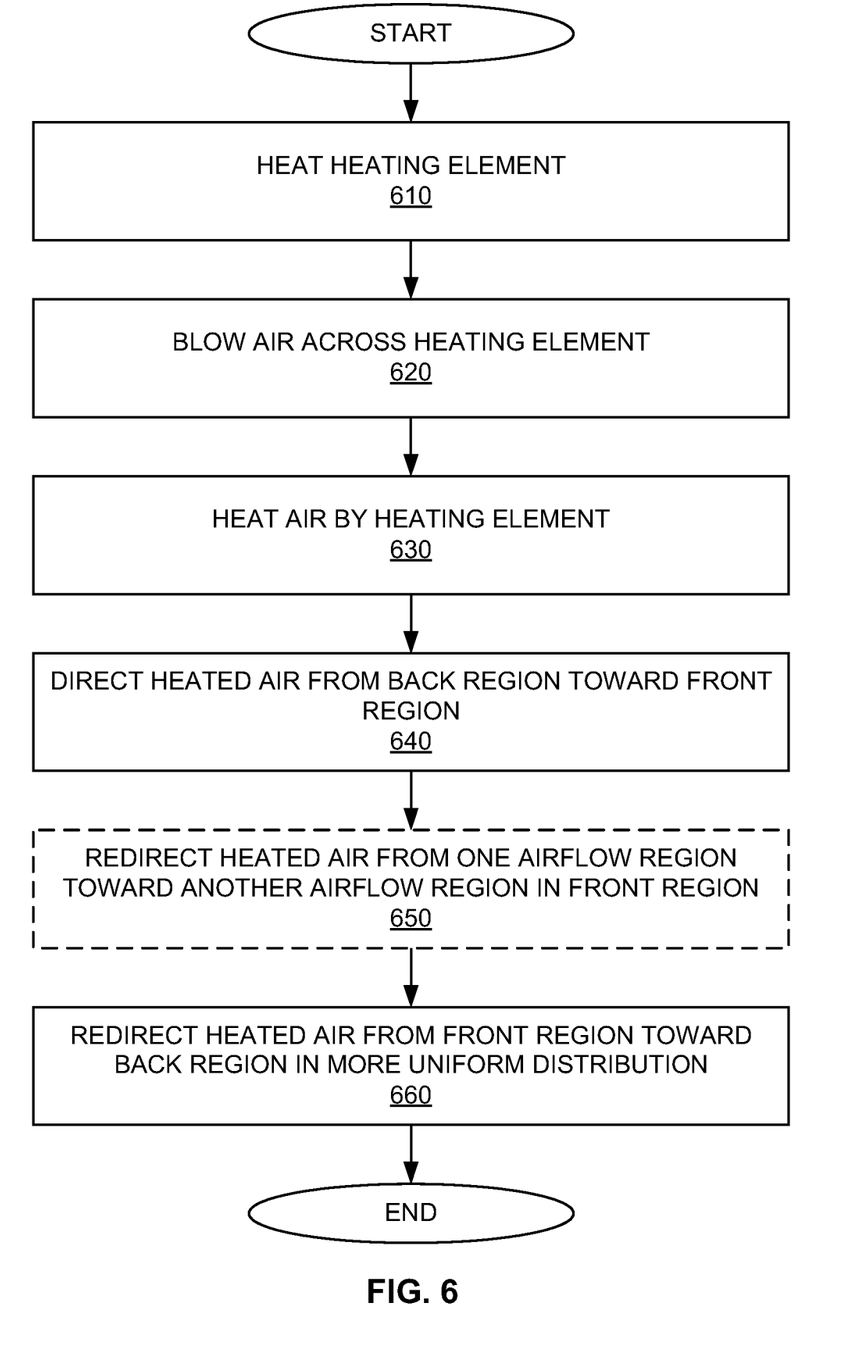
FIG. 6 illustrates a method of heating an oven, according to an embodiment.

FIG. 6 illustrates a method of heating an oven, according to an embodiment. In a step 610, a heating element is heated to heat an interior of the oven. The heating element may be heated at a back region of the oven. The heating element may be an electrical heating element and may be heated by passing electrical current through an electrical device, for example, an electrically resistive heating element or a thermoelectric device. Other heating elements that are heated by or heat air using other power sources or fuels may be used in various embodiments as known in the art, for example, gas, propane, or kerosene. The heating element may be heated to a temperature at or above the boiling point of water, which is 100 degrees centigrade at one atmosphere of pressure under standard conditions. The boiling point of water is a physical property of water that depends upon factors such as environmental conditions including atmospheric pressure. Impurities, such as salt, in the water may increase its boiling point. Also, in aircraft during flight, the atmospheric pressure is typically less than one atmosphere of pressure. As a result, the boiling temperature of water in an aircraft during flight is typically a lower temperature than it would be at one atmosphere of pressure. In various embodiments, the heating element may be heated to 100, 150, 200, 250, or 300 degrees centigrade, or more, and may heat the air within a compartment of the oven.

In a step 620, air is blown across the heating element heated in step 610. The air may be blown by a fan, e.g., fan 460. The air may be blown in a direction from the fan toward the heating element whereby the majority of the air blown by the fan is blown across the heating element. The fan may blow the air outwardly from the fan across the heating element that encircles the fan. The speed and direction of airflow through the fan may be set by a variably controlled electrical power used to drive a motor of the fan.

In a step 630, the heating element heats the air that flows across the heating element. The air may be heated by an incremental amount each time the air flows across the heating element as the air circulates within the oven, raising a temperature of the air each time the air flows across the heating element. The air may decrease in temperature as the air circulates through the oven before returning to the fan. The amount by which the air temperature is increased by passing across the heating element may be determined by how hot the heating element is, which in turn may be determined by how much electrical current is passing through the heating element in the case of an electrical heating element.

In a step 640, the heated air is directed from a back region of the oven toward a front region of the oven. The heated air may be directed through one or more meal carriers in which a plurality of meal trays are disposed as the heated air flows toward the front region of the oven. The heated air may heat meals on the meal trays as the heated air flows around them. In various embodiments, the oven compartment may be divided into a first side or region and a second side or region (e.g., left region and right region, or vice versa), and the heated air may be directed from the back of the first region to the front of the first region of the oven compartment. In various embodiments, the oven compartment may be divided into a top side and a bottom side, or an upper-left triangle and a lower-right triangle, or an upper-right triangle and a lower-left triangle, or other geometric regions that support airflow in one direction in one set of one or more regions and in an opposite direction in a different set of one or more regions.

In an optional step 650, the heated air arriving at the front region through one airflow region (e.g., the first side or region) is redirected from the one airflow region toward another airflow region of the front region (e.g., from the first side or region to the second side or region). The heated air may be redirected by at least one of a plurality of profile elements (e.g., fins, blades, or hole patterns) disposed on a generally vertical panel at the front region of the oven, for example, at an inside of a front door of the oven. Optional step 650 may be performed when the heated air is directed toward the front region through one airflow region of the oven, and directed away from the front region through another airflow region of the oven, for example.

The regions of the oven in which air flows in opposite directions from one another (i.e., airflow regions) may be separated by a divider which provides an opening at the front region of the oven compartment to facilitate redirecting the heated air at the front region from the one airflow region to the other airflow region. The divider may be oriented in different directions, depending upon the geometries of the airflow regions in which air flows in opposite directions. For example, in various embodiments, the divider may be oriented vertically between left and right airflow regions, horizontally between an upper airflow region and a lower airflow region, or diagonally between triangular airflow regions. Generally, there may be one less divider than number of airflow regions in which air flows in an opposite direction compared to neighboring regions. Although two airflow regions are shown and described with respect to the exemplary embodiments discussed herein, this should not be construed as limiting, as there may be more than two airflow regions, which may be separated by two or more dividers, in various embodiments.

In a step 660, the heated air is redirected from the front region toward the back region of the oven by at least one of the plurality of profile elements disposed on the generally vertical panel at the front region of the oven. The heated air may be redirected toward the back region in a more uniform spatial distribution than would result from a flat generally vertical panel, such as a flat inside of an oven door. The heated air may be directed through one or more meal carriers in which a plurality of meal trays are disposed as the heated air flows toward the back region of the oven. The heated air may heat meals on the meal trays as the heated air flows around them. Since the heated air may be flowing in a more uniform distribution, the meals on the meal trays may be more uniformly heated by the oven than in conventional ovens that do not include the plurality of profile elements disposed on the generally vertical panel at the front region of the oven.

In the various embodiments in which the oven compartment is divided into a plurality of airflow regions in which air flows in an opposite direction compared to neighboring regions, (e.g., a left side or region and a right side or region), the heated air may be redirected to the back of the oven from the region(s) at the front of the oven compartment that receive the heated air from the other region(s) at the front of the oven compartment that receive the heated air from the back region of the oven compartment (e.g., the front of the second region to the back of the second region of the oven compartment). Once the air reaches the back region of the oven compartment from the front region, the air may complete a circular path and the method may repeat starting at step 610.

Figure 7:
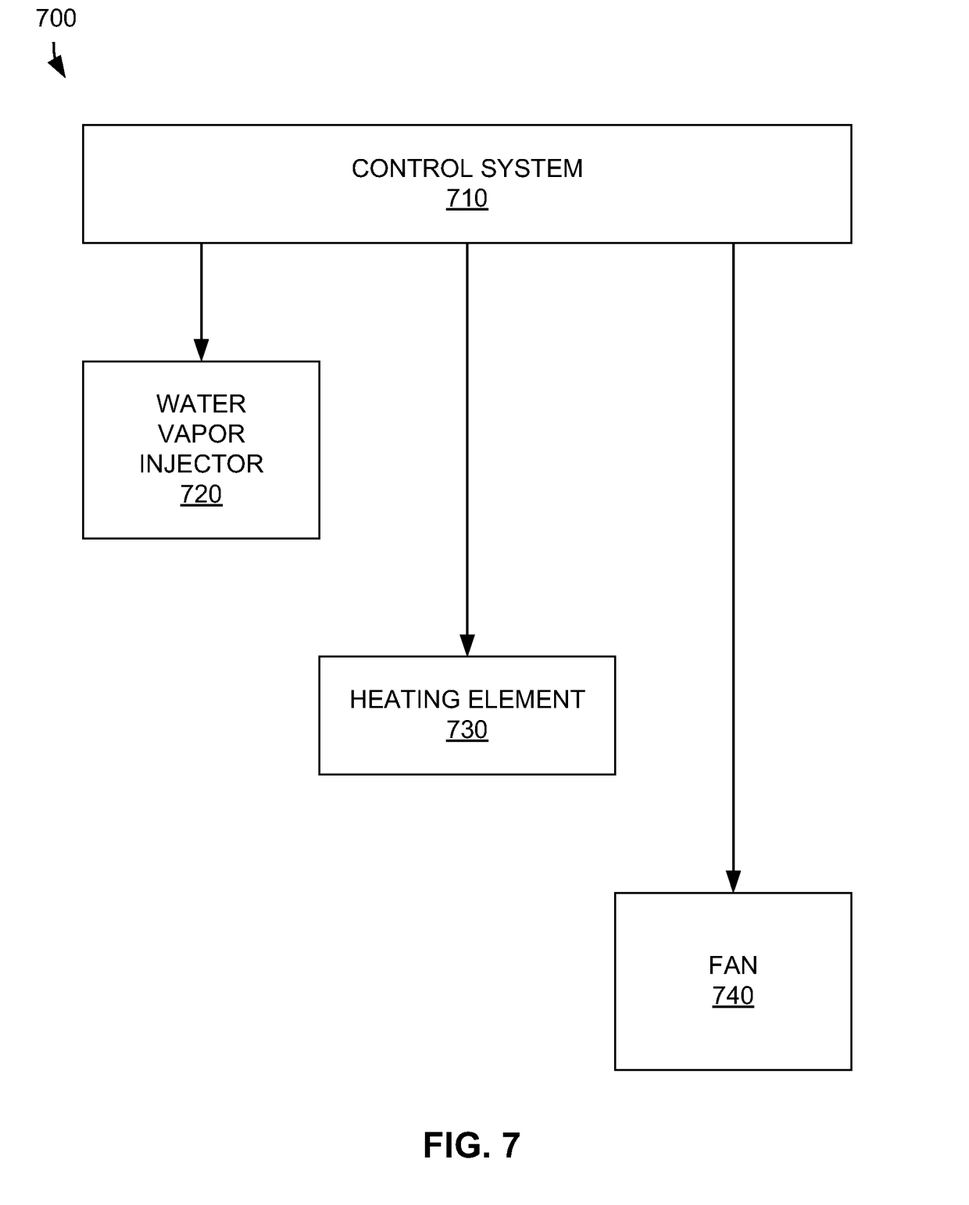
FIG. 7 illustrates a system for heating an oven, according to an embodiment.

FIG. 7 illustrates a system 700 for heating an oven, according to an embodiment. A control system 710 may control the oven according to the methods described herein. The control system 710 may include an embodiment of the controller 800 shown in FIG. 8. The control system 710 may include sensors and actuators and control the oven's water vapor injector 720, heating element 730, and/or fan 740 using the sensors and actuators. The sensors may include temperature sensors, for example, that measure temperature of air near the water vapor injector 720, near the heating element 730, near the fan 740, or in other areas within a compartment of the oven, or that measure temperature of the heating element 730 or other elements themselves. The sensors may also include humidity sensors, for example, that measure humidity of air near the water vapor injector 720, heating element 730, near the fan 740, or in other areas within a compartment of the oven. The sensors may additionally include flow sensors that measure an amount of airflow from the fan 740 near the fan 740 or in other areas of the compartment in which air flows, or measure an amount of fluid or water flow through the water vapor injector 720 and/or water supply piping that provides water to the water vapor injector 720. The sensors may also include a pressure sensor that measures the air pressure within the oven. The sensors further may include a current sensor that measures how much electrical current flows through the heating element 730 or a voltage that measures the voltage across the heating element 730 in the case of an electrical heating element. The actuators may include a motor that drives the fan 740, an actuator that controls water flow through the water vapor injector 720, and an element such as a switch or driver that controls an amount of electrical current that flows through the heating element 730 in the case of an electrical heating element.

Figure 8:
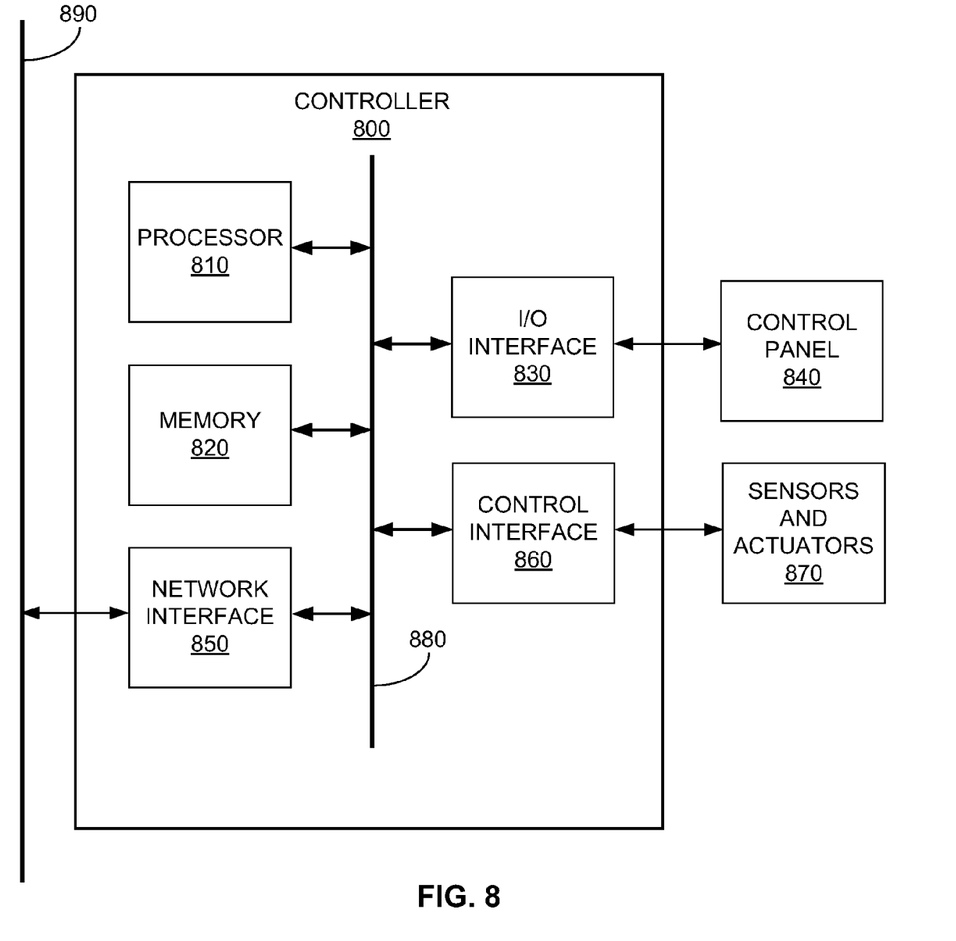
FIG. 8 illustrates a controller for heating an oven, according to an embodiment.

FIG. 8 illustrates a controller for heating an oven, according to an embodiment. The controller 800 may be coupled with a control panel 840 via an I/O interface 830. The controller 800 may be included in the oven 400, for example, and the control panel 840 may be installed on an exterior surface of the oven 400 or near an installation location of the oven 400. The controller 800 may receive input commands from a user via the control panel 840 such as turning the oven on or off, selecting an operation mode, and setting a desired temperature of the compartment of the oven. The controller 800 may output information to the user regarding an operational status (e.g., operational mode, activation of a steam generation cycle, shut-off due to over-temperature conditions of the oven and/or components of the oven, etc.) of the oven using the control panel 840.

The controller 800 may include a processor 810 that performs computations according to program instructions, a memory 820 that stores the program instructions and other data used or generated by the processor 810, and a network interface 850 that includes data communications circuitry for interfacing to a data communications network 890 such as Ethernet, Galley Data Bus (GAN), or Controller Area Network (CAN). The processor 810 may include a microprocessor, a Field Programmable Gate Array, an Application Specific Integrated Circuit, or a custom Very Large Scale Integrated circuit chip, or other electronic circuitry that performs a control function. The processor 810 may also include a state machine. The controller 800 may also include one or more electronic circuits and printed circuit boards. The processor 810, memory 820, and network interface 850 may be coupled with one another using one or more data buses 880. The controller 800 may communicate with and control various sensors and actuators 870 of the oven via a control interface 860. The sensors and actuators of the control system 710 may be embodiments of the sensors and actuators 870 of FIG. 8.

The controller 800 may be controlled by or communicate with a centralized computing system, such as one onboard an aircraft. The controller 800 may implement a compliant ARINC 812 logical communication interface on a compliant ARINC 810 physical interface. The controller 800 may communicate via the Galley Data Bus (e.g., galley networked GAN bus), and exchange data with a Galley Network Controller (e.g., Master GAIN Control Unit as described in the ARINC 812 specification). In accordance with the ARINC 812 specification, the controller 800 may provide network monitoring, power control, remote operation, failure monitoring, and data transfer functions. The controller 800 may implement menu definitions requests received from the Galley Network Controller (GNC) for presentation on a GNC Touchpanel display device and process associated button push events to respond appropriately. The controller 800 may provide additional communications using an RS-232 communications interface and/or an infrared data port, such as communications with a personal computer (PC) or a personal digital assistant (PDA). Such additional communications may include real-time monitoring of operations of the oven, long-term data retrieval, and control system software upgrades. In addition, the control interface 860 may include a serial peripheral interface (SPI) bus that may be used to communicate between the controller 800 and motor controllers within the oven.

A user may select a desired temperature for the oven using the control panel 840. The user may also select a desired humidity and/or pressure for the oven compartment using the control panel 840. The controller 800 may control a temperature within the oven compartment at a high level of precision according to the desired temperature. The controller 800 may also control a humidity within the oven compartment at a high level of precision according to the desired humidity, and/or according to a desired pressure. For example, when the pressure drops below a threshold, additional water vapor may be injected into the oven compartment to increase the pressure. Therefore, quality of food cooked within the oven compartment may be uniformly obtained according to the user-selected operational mode of the oven.

According to embodiments described herein, an oven may have more equal airflow velocities throughout an interior of an oven compartment than conventional ovens. Consequently, embodiments may heat or cook food within the oven more uniformly and equally in different locations within the oven than conventional ovens.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. An oven comprising:
   a compartment enclosed on all sides and defining an interior between the sides, the sides including at least a front side and a back side;
   a heating element operable to heat air within the interior of the compartment;
   a fan disposed in fluid communication with the interior of the compartment, the fan operable to cause air to flow across the heating element and from the back side of the compartment toward the front side of the compartment;
   a door at the front side of the compartment, the door including a panel on an interior side of the door and operable to open the compartment;
   a divider dividing sides of the compartment through which air flows in opposite directions from one another, the divider being disposed parallel with a direction of airflow on either side of the divider, the divider providing an opening at the front side of the compartment to facilitate air flowing from the fan to the front side of the compartment through a first region adjacent the divider, through the opening in the divider at the front side of the compartment from the first region to a second region on an opposite side of the divider, and from the front side of the compartment toward the fan through the second region adjacent the divider, wherein each of the first region and the second region is configured to accommodate at least one of a plurality of meal carriers; and
   a plurality of profile elements disposed on a surface of the panel facing the interior of the compartment, the plurality of profile elements being structurally configured to direct air received at the panel through the first region, through the opening provided by the divider, and back toward the fan through second region in a more uniform spatial distribution than would result from a flat panel.

2. The oven of claim 1, wherein each of the plurality of profile elements is selected from the group consisting of fins, blades, and hole patterns.

3. The oven of claim 1, wherein each of the plurality of profile elements have a surface disposed at an angle relative to a plane of the surface of the panel.

4. An oven comprising:
   a compartment enclosed on all sides, the sides including at least a front side and a back side;
   a heating element operable to heat air within the compartment;
   a fan disposed at the back side of the compartment, the fan operable to cause air to flow across the heating element and toward the front side of the compartment;
   a door at the front side of the compartment, the door including a generally vertical panel on an interior side of the door and operable to open the compartment;
   a divider dividing sides of the compartment through which air flows in opposite directions from one another, the divider being disposed parallel with a direction of airflow on either side of the divider, the divider providing an opening at the front side of the compartment to facilitate air flowing from the fan to the front side of the compartment through a first region adjacent the divider, through the opening in the divider at the front side of the compartment from the first region to a second region on an opposite side of the divider, and from the front side of the compartment toward the fan through the second region adjacent the divider, wherein each of the first region and the second region is configured to accommodate at least one of a plurality of meal carriers; and
   a plurality of profile elements disposed on a surface of the generally vertical panel facing the interior of the compartment, the plurality of profile elements being structurally configured to direct air received at the generally vertical panel from the fan back toward the fan through an interior of the compartment in a more uniform spatial distribution than would result from a flat generally vertical panel.

5. The oven of claim 4, wherein each of the plurality of profile elements is selected from the group consisting of fins, blades, and hole patterns.

6. The oven of claim 4, wherein each of the plurality of profile elements have a surface disposed at an angle relative to a plane of the surface of the generally vertical panel.

7. The oven of claim 4, wherein the heating element comprises an electrical heating element that heats when electrical current is passed therethrough.

8. The oven of claim 4, wherein the heating element encircles a majority of the fan and the fan blows air outwardly across a majority of the heating element that encircles the fan.

9. A method of heating an oven comprising:
   heating a heating element of the oven;
   causing air to flow across the heated heating element by a fan;
   heating the air that flows across the heated heating element by the heating element;
   directing the heated air from a back side through a first airflow region toward a front side of the oven, the first airflow region separated from a second airflow region, a divider that divides the compartment into the first airflow region and the second airflow region, air flowing parallel with the divider and in an opposite direction in the second airflow region compared to the first airflow region, wherein each of the first airflow region and the second airflow region is configured to accommodate at least one of a plurality of meal carriers;
   redirecting the heated air from the first airflow region, through an opening in the divider at the front side, and through the second airflow region toward the back side by a plurality of profile elements disposed on a surface of a generally vertical panel on an interior side of a door at the front side of the oven, the plurality of profile elements facing the interior of the oven, the door being operable to open the oven, and structurally configured to direct air received at the panel from the fan through the first airflow region through the opening provided by the divider, and back toward the fan through the second airflow region in a more uniform spatial distribution than would result from a flat generally vertical panel.

10. The method of claim 9, wherein each of the plurality of profile elements is selected from the group consisting of fins, blades, and hole patterns.

11. The method of claim 9, wherein:
    directing the heated air toward the front side further comprises directing the heated air through the at least one meal carrier in the first airflow region, and
    redirecting the heated air from the front side toward the back side further comprises directing the heated air through the at least one meal carrier in the second airflow region.

12. The method of claim 9, wherein heating the heating element comprises passing electrical current through an electrical heating element.

\* \* \* \* \*